(12) United States Patent
Miller

(10) Patent No.: US 6,719,920 B2
(45) Date of Patent: Apr. 13, 2004

(54) SLURRY FOR POLISHING A BARRIER LAYER

(75) Inventor: Anne E. Miller, Portland, OR (US)

(73) Assignee: Intel Corporation, Santa Clara, CA (US)

(*) Notice: Subject to any disclaimer, the term of this patent is extended or adjusted under 35 U.S.C. 154(b) by 17 days.

(21) Appl. No.: 10/002,855

(22) Filed: Nov. 30, 2001

(65) Prior Publication Data

US 2003/0102457 A1 Jun. 5, 2003

(51) Int. Cl.$^7$ ............ C09K 13/00; C09K 13/06; H01L 21/302
(52) U.S. Cl. ............ 252/79.1; 252/79.4; 438/692
(58) Field of Search ............ 252/79.1, 79.4; 438/692

(56) References Cited

U.S. PATENT DOCUMENTS

| | | | |
|---|---|---|---|
| 4,752,328 A | * 6/1988 | Peterson | 523/122 |
| 5,340,370 A | 8/1994 | Cadien et al. | 51/308 |
| 5,575,706 A | * 11/1996 | Tsai et al. | 451/41 |
| 5,604,158 A | 2/1997 | Cadien et al. | 437/200 |
| 5,700,383 A | 12/1997 | Feller et al. | 216/88 |
| 5,836,806 A | 11/1998 | Cadien et al. | 451/41 |
| 5,897,375 A | * 4/1999 | Watts et al. | 438/693 |
| 5,904,159 A | * 5/1999 | Kato et al. | 134/7 |
| 5,913,147 A | 6/1999 | Dubin et al. | 438/687 |
| 5,954,997 A | * 9/1999 | Kaufman et al. | 252/79.1 |
| 6,027,554 A | * 2/2000 | Kodama et al. | 106/3 |
| 6,083,419 A | * 7/2000 | Grumbine et al. | 252/79.1 |
| 6,242,351 B1 | * 6/2001 | Li et al. | 438/690 |

* cited by examiner

Primary Examiner—Nadine G. Norton
Assistant Examiner—Lynette T. Umez-Eronini
(74) Attorney, Agent, or Firm—Mark V. Seeley

(57) ABSTRACT

A slurry is described that comprises a mixture of between about 0.01 mole and about 0.1 mole per liter of an organic acid salt, between about 1% to about 20% by volume of an abrasive, and an oxidizer.

2 Claims, 3 Drawing Sheets

SLURRY FOR POLISHING A BARRIER LAYER

FIELD OF THE INVENTION

The present invention relates to slurries for use in chemical mechanical polishing, in particular, the polishing of barrier layers that isolate copper interconnects.

BACKGROUND OF THE INVENTION

When making advanced semiconductor devices, copper interconnect lines may offer a number of advantages over aluminum-based interconnects. For that reason, those making such devices have turned to copper as the material of choice for making the devices' interconnects. To minimize unwanted diffusion of copper into other device regions (e.g., adjacent dielectric layers or transistor areas), barrier layers may be formed to insulate copper interconnects from those other regions.

When a single or dual damascene process is used to form a copper interconnect for a semiconductor device, such a barrier layer is deposited onto a dielectric layer to line a trench (or trench and via) that was etched into that layer. In addition to lining the trench, the barrier layer extends across the surface of the dielectric layer. A seed material, e.g., one including copper, is deposited on the barrier layer, followed by performing a conventional copper electroplating process to form a copper layer. Like the barrier layer, excess copper may form on the dielectric layer.

After the barrier and copper layers have been formed on the dielectric layer, excess material (i.e., material deposited outside the trenches) must be removed. A conventional chemical mechanical polishing ("CMP") process is typically used to perform that function. In an example of such a process, a substrate or wafer—held by a carrier—is placed face down on a polishing pad that is fixed to a table (sometimes called a platen). The carrier applies a downward pressure on the backside of the substrate as the carrier and platen are rotated. Meanwhile, a slurry is deposited onto the pad as the substrate is polished. A slurry that differs from the one used to remove the excess copper may be used to remove the excess barrier layer material, which is located beneath the copper layer.

Current CMP processes can yield defective devices. When a CMP process removes copper from a barrier layer, it may form a depression within the trench. Such a "dishing" effect can give the dielectric layers—subsequently formed on the copper—a similarly shaped indentation where formed above the copper. That indentation results because dielectric layer deposition is, in general, a conformal process. When copper is deposited on those dielectric layers, copper fills that indentation when it fills the trenches. If the subsequent copper CMP step stops on the dielectric layer, copper "puddles" may remain at the end of that polishing process. If those copper "puddles" touch adjacent copper lines, those lines could be shorted.

Another problem may arise because of the way slurry composition affects the polish rate for different materials. When certain slurries are used to remove a barrier layer (e.g., one containing tantalum or tantalum nitride) from the surface of a dielectric layer—after excess copper has been removed from the barrier layer's surface, the barrier and dielectric layers may polish at a faster rate than the remaining copper. As a consequence, the resulting dielectric layer may be recessed below the copper to a significant degree (e.g., greater than about 200 angstroms). At the interface between the dielectric layer and the copper, which fills the trench, an additional localized polished region may form a depression at the edge of the copper layer, which may appear as "fangs," when viewed in cross-section. Such "fangs" could exceed 600 angstroms in height.

For certain dielectric layers (e.g., silicon oxyfluoride—hereinafter identified as "SiOF"), a slurry may enable copper, and the barrier and dielectric materials, to be polished at similar rates. Using such a slurry may enable dielectric, barrier and copper layers to be polished down to a substantially planar structure—eliminating, or at least reducing, any adverse impact that may result from "dishing," recessed dielectric layers, or "fang" like protrusions. When, however, the dielectric layer is made from other types of materials (e.g., a carbon doped oxide, hereinafter identified as "CDO"), such a slurry may not cause these materials to polish at similar rates.

Accordingly, there is a need for a new slurry for polishing a barrier layer. There is need for such a slurry that enables a CMP process to simultaneously remove copper, and barrier and dielectric layer materials, to produce a substantially planar surface. There is also a need for a tunable slurry that enables such materials to be polished at similar rates, even when the dielectric layer is formed from different substances. The present invention provides such a slurry.

DETAILED DESCRIPTION OF THE PRESENT INVENTION

A slurry is described for polishing a barrier layer using a CMP process.

That slurry comprises a mixture of between about 0.01 mole and about 0.1 mole per liter of an organic acid salt, between about 1% and about 20% by volume of an abrasive, and an oxidizer. In the following description, a number of details are set forth to provide a thorough understanding of the present invention. It will be apparent to those skilled in the art, however, that the invention may be practiced in many ways other than those expressly described here. The invention is thus not limited by the specific details disclosed below.

Figure 1A:
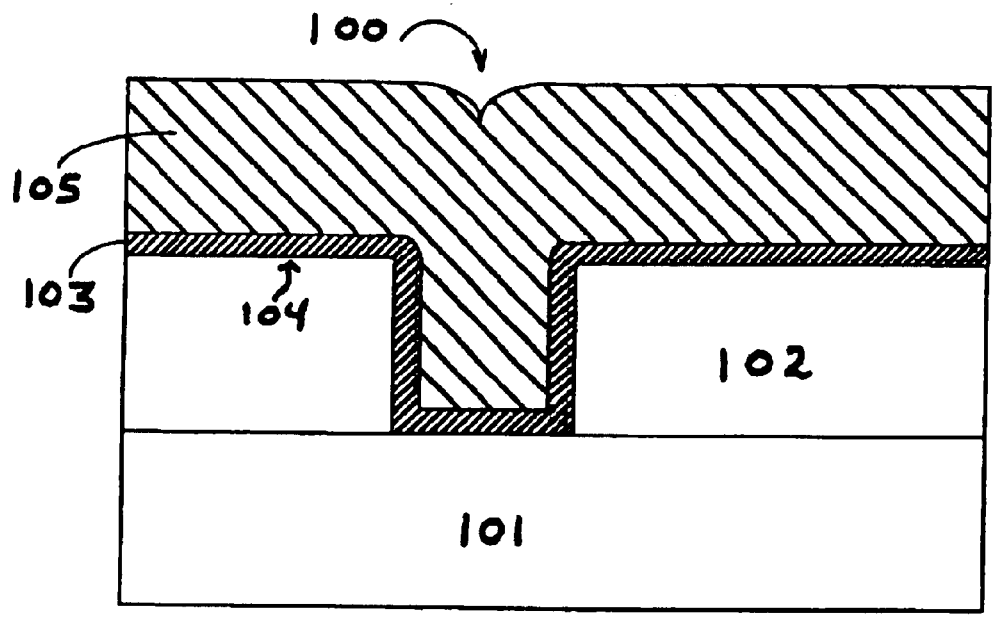
FIG. 1a represents a cross-section of a structure that may be formed when making a semiconductor device.

FIG. 1a represents a cross-section of structure 100, which may be formed when making a semiconductor device. Structure 100 includes substrate 101, upon which is formed dielectric layer 102. A trench has been etched into dielectric layer 102. That trench is lined with barrier layer 103. In addition to lining the trench, barrier layer 103 extends across surface 104 of dielectric layer 102. Copper layer 105 fills the trench and covers barrier layer 103, where that layer rests on top of surface 104. Structure 100 may be formed using conventional processes that are well known to those skilled in the art.

Figure 1B:
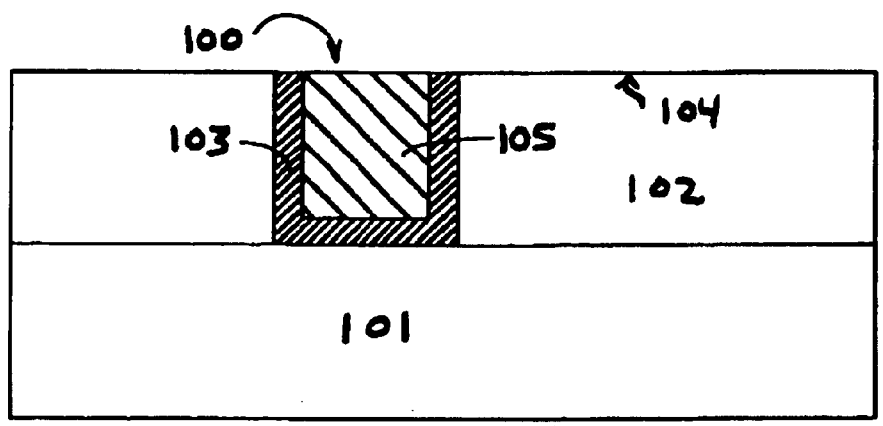
FIG. 1b represents a cross-section of the structure of FIG. 1a after a CMP step (or steps) has removed excess copper and an underlying barrier layer from the surface of a dielectric layer.

After forming the FIG. 1a structure, the excess material deposited on surface 104 must be removed. That material may be removed using a CMP process. FIG. 1b represents a cross-section of structure 100 after a CMP step has removed excess material from surface 104 of dielectric layer 102, generating a structure in which barrier layer 103 and copper layer 105 remain within the trench only. (If a copper oxide layer forms on copper layer 105, a pre-polish cleaning process may be applied to remove that layer prior to commencing the primary CMP operation. A post-polish cleaning process may follow the CMP step. Such pre-polish and post-polish cleaning processes are described in Ser. No. 09/729,609, filed Dec. 4, 2000, and assigned to this application's assignee.)

Figure 2:
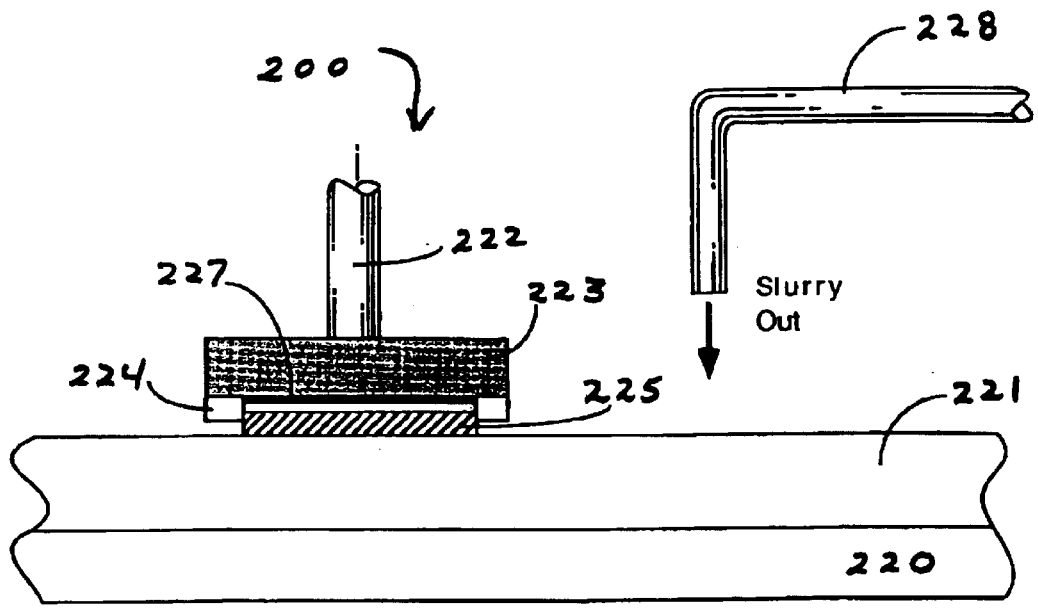
FIG. 2 represents a cross-section of an apparatus that may be used to remove a barrier layer from the surface of a dielectric layer using a CMP process.

FIG. 2 represents a cross-section of one type of rotary CMP apparatus that may be used to remove a barrier layer from the surface of a dielectric layer using a CMP process. Although the barrier slurry chemistry of the present invention may be used with an apparatus like the one represented by apparatus 200 in FIG. 2, that barrier slurry chemistry is compatible with, and can be optimized for use with, any type of polishing apparatus. In the rotary CMP process, substrate or wafer 225 is placed face down on pad 221, which is fixed to table 220. This ensures that the material to be polished, i.e., the barrier layer, directly contacts pad 221. Pad 221 enables a slurry to be transported to substrate 225. Carrier 223 applies a downward pressure against the back side of substrate 225 by means of shaft 222, which is attached to carrier 223. Carrier 223 may include pad 227 to protect substrate 223, and retaining ring 224 to prevent lateral movement of substrate 225. As table 220 and/or carrier 223 are rotated, slurry is dispensed or pumped through pipe 228 onto pad 221.

To remove a barrier layer from the surface of a dielectric layer with such an apparatus, the slurry of the present invention may be used. That slurry comprises a mixture of between about 0.01 mole and about 0.1 mole per liter of an organic acid salt, between about 1% and about 20% by volume of an abrasive, and an oxidizer. In a preferred embodiment of the present invention, the oxidizer may be present in the mixture at a concentration of between about 0.0004 and about 2 moles per liter.

The organic acid salt included in the slurry of the present invention may comprise a carboxylic acid salt. Preferred include salts of citric acid and acetic acid, e.g., potassium citrate, ammonium citrate, ammonium bicitrate, and potassium acetate—although other organic acid salts may be used instead. In addition to the organic acid salt, the slurry may include an organic acid, e.g., citric acid or acetic acid. When an organic acid and an organic acid salt are combined, the total amount of those components that is included in the mixture should be between about 0.01 mole and about 0.1 mole per liter of slurry.

The abrasive may comprise a silica based material, e.g., one comprising colloidal (i.e., precipitated) or fumed silica. Such a silica based material preferably has a surface area that is between about 5 and about 600 m$^2$/g. The preferred oxidizer is hydrogen peroxide, which may be available as a 30% $H_2O_2$ solution (i.e., a solution that includes about 30% by weight $H_2O_2$ in water). Although up to 40 grams of such a solution may be added per liter of slurry (0.35 moles $H_2O_2$/liter), preferably less than about 10 grams of 30% $H_2O_2$ per liter (0.088 M/l), and more preferably less than about 0.5 grams per liter (0.0044 M/l), should be included in the mixture. The mixture should have a pH between about 2.5 and about 12.0, and more preferably a pH that is greater than about 7.0. Maintaining a relatively high pH for the slurry may help to minimize defects due to pitting corrosion and/or galvanic corrosion. To increase the pH, it may be desirable to include in the mixture an effective amount of an alkaline component, e.g., potassium hydroxide or ammonium hydroxide.

In addition to these components, the slurry of the present invention may further include a surfactant, a corrosion inhibitor, and/or a biocide. The surfactant may help reduce erosion of the dielectric layer, which may otherwise occur when high density interconnects are formed. The corrosion inhibitor may help to minimize corrosion of the copper. The biocide may help to eliminate—or substantially eliminate—from the slurry organisms (e.g., fungi or mold) that could form undesirable particulate deposits on device surfaces.

The surfactant that may be included in the slurry of the present invention may comprise cetyltrimethylammonium bromide (or other components that consist of a cetyltrimethylammonium cation and a halogen anion, e.g., cetyltrimethylammonium chloride), cetyltrimethylammonium hydroxide, or polyoxyethylene ether. Alternatives may include other cationic surfactants such as, for example, a quaternary ammonium halide, or a quaternary ammonium hydroxide; or nonionic surfactants such as, for example, a dimethyl silicone ethylene oxide, or an alkyl polyethylene oxide. Other possibilities include: dodecyltrimethylammonium choride, dodecyltrimethylammonium bromide, octadecylmethylpolyoxyethyleneammonium chloride, or an alkyltrimethylammonium halide where the alkyl group has at least twelve carbon atoms. When added, the surfactant preferably should not exceed about 0.1 wt. % of the total slurry. Even in such relatively small amounts, the surfactant may serve to control dielectric layer recession.

The corrosion inhibitor that may be included in the slurry of the present invention may comprise benzotriazole, a cetyltrimethylammonium halide, or cetyltrimethylammonium hydroxide. When included as the corrosion inhibitor, benzotriazole preferably should be added at a concentration of between about 0.001 M and about 0.05 M. Further detail related to the use of surfactants and/or corrosion inhibitors in slurries used in CMP processes is given in Ser. No. 09/715,690, filed Nov. 16, 2000, and assigned to this application's assignee. Biocides that may be included in the slurry are available from a number of commercial sources, such as Rohm and Haas Company, which sells one under the tradename Kathon® CG/ICP. A biocide, when added, preferably should not exceed about 300 ppm.

The slurry of the present invention may be used to remove from a dielectric layer various types of barrier layers, e.g., single or multi-layered barrier layers made from the following materials: tantalum, tantalum nitride, tantalum silicon nitride, tungsten, tungsten nitride, tungsten silicon nitride, titanium, titanium nitride, and titanium silicon nitride. Tantalum or tantalum nitride may be particularly preferred for making a barrier layer that isolates a copper layer from a dielectric layer. When such materials are used to form such a barrier layer, the slurry of the present invention may effectively remove such materials from the surface of an SiOF or CDO dielectric layer without degrading or eroding that layer, or generating dielectric recession, or the fang-like protrusion structures described above. Provided below are a number of examples that illustrate the rates at which the slurry of the present invention can remove tantalum, copper, SiOF and CDO.

EXAMPLE 1

Tantalum, copper and SiOF were removed from blank test wafers using an IPEC 572 orbital polisher (from Speed-Fam IPEC, 305 North 54$^{Th}$ Street, Chandler, Ariz. 85225) and a Politex pad (from Rodel, 3804 East Watkins Street, Phoenix, Ariz. 85034) operated under the following conditions: pressure of 2 psi; spindle rpm of 300; wafer rpm of 18.75; slurry flow rate of 130 ccm; and delta P of −0.4 psi.

A slurry used in this process had a pH of 7.4 and included the following components: an abrasive, i.e., 8.8 volume % of a precipitated silica abrasive (70 nm) Fax9603 (from Fujimi America, 9949 SW Commerce Circle, Wilsonville, Oreg. 97070); a citric acid salt, i.e., 14.7 grams of potassium citrate per liter of slurry; an oxidizer, i.e., 0.38 grams of a 30% $H_2O_2$ solution per liter of slurry (equivalent to 0.0033M); and a water solvent. Using that slurry in the system identified above, and operated under the specified conditions, caused tantalum to be removed at about 590 angstroms per minute, copper to be removed at about 694 angstroms per minute, and SiOF to be removed at about 610 angstroms per minute.

EXAMPLE 2

Using the same system and operating conditions specified above, and the same slurry, except modified to remove the oxidizer, tantalum was removed at about 588 angstroms per minute, copper was removed at about 52 angstroms per minute, and SiOF was removed at about 682 angstroms per minute.

EXAMPLE 3

Using the same system and operating conditions specified above, and the example 1 slurry, except modified to include 14 ppm of Kathon CG/ICP biocide, tantalum was removed at about 638 angstroms per minute, copper was removed at about 625 angstroms per minute, and SiOF was removed at about 660 angstroms per minute.

EXAMPLE 4

Using the same system and operating conditions specified above, and the example 1 slurry, except modified to replace the Fax9603 material with a fumed silica abrasive, i.e., 4.4 volume % fumed silica (140 nm PL4271), tantalum was removed at about 616 angstroms per minute, copper was removed at about 951 angstroms per minute, and SiOF was removed at about 577 angstroms per minute.

EXAMPLE 5

Tantalum, copper, SiOF and CDO were removed from blank test wafers using a Mirra 8" rotary polisher and a Politex pad operated under the following conditions: pressure of 4 psi; platen rpm of 63; and a slurry flow rate between about 180 ccm and about 200 ccm. Using the slurry of example 1 in this system operated under the specified conditions caused tantalum to be removed at about 449 angstroms per minute, copper to be removed at about 678 angstroms per minute, SiOF to be removed at about 1064 angstroms per minute, and CDO to be removed at about 999 angstroms per minute.

Figure 3:
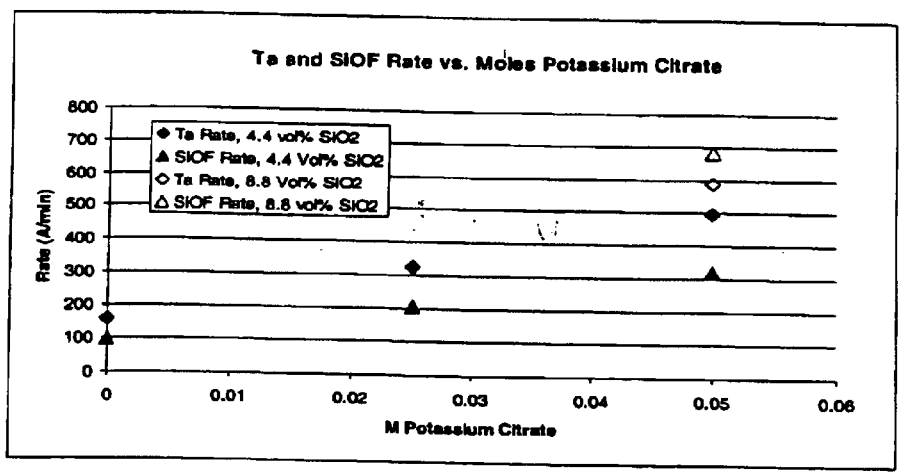
FIG. 3 is a graph that illustrates how changes in the concentration of potassium citrate and an abrasive affect the removal rates of tantalum and SiOF.
Figure 4:
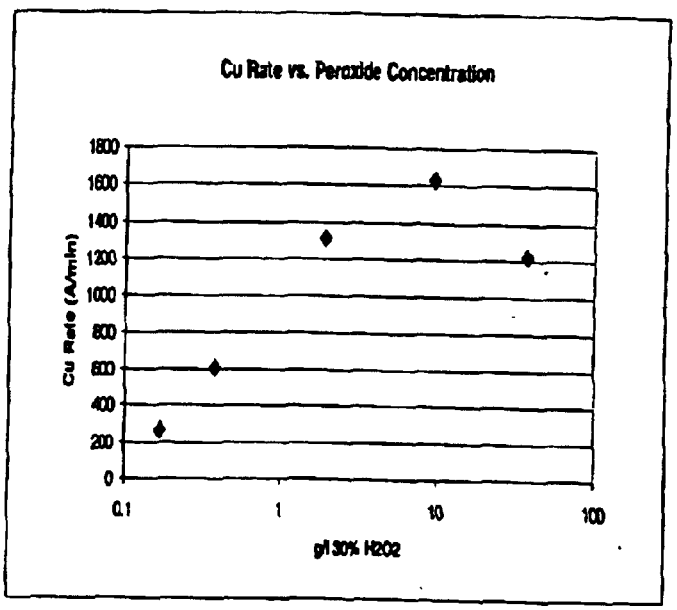
FIG. 4 is a graph that illustrates, on a logarithmic scale, how changes in peroxide concentration affect the removal rates of copper.
Figure 5:
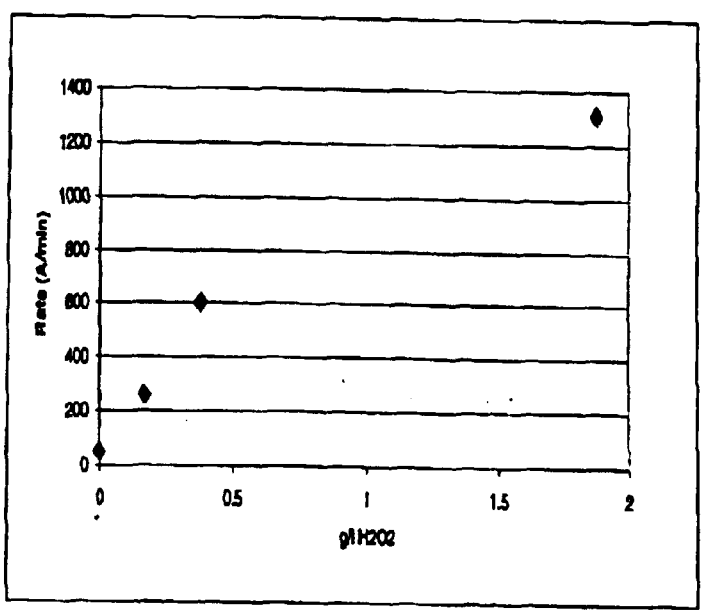
FIG. 5 is a graph that illustrates, on a smaller, linear scale, how changes in peroxide concentration affect the removal rates of copper.

FIGS. 3–5 illustrate how changes in potassium citrate concentration affect the removal rates of tantalum and SiOF, and how changes in peroxide concentration affect the removal rates of copper, respectively. FIG. 3 shows how changes in the molar ("M") concentration of potassium citrate affected tantalum ("Ta") and SiOF removal rates (measured in angstroms per minute ("A/min")). Removal rates are shown for slurries with 8.8 volume % or 4.4 volume % of a silica based abrasive material ("$SiO_2$"). FIGS. 4 and 5 show how changing the amount of 30% $H_2O_2$ solution that is added to the slurry (shown as grams of 30% $H_2O_2$ per liter of slurry ("g/l")) affected the rate at which copper was removed (measured in angstroms per minute ("A/min")). FIG. 4 illustrates this data on a logarithmic scale, while FIG. 5 provides the data on a linear scale.

These results indicate that one may control the rate at which tantalum and SiOF are removed by changing citrate and abrasive concentration, and that one can control copper removal rates by changing peroxide concentration. As these figures demonstrate, by varying the amounts of the components that are included in the slurry, the slurry of the present invention may enable one to control the rates at which copper, the barrier layer, and the dielectric layer, are removed.

Because such a slurry enables the dielectric layer— whether formed from SiOF or CDO—to be polished at a relatively high rate, a CMP process that uses it may planarize the substrate, rendering the barrier layer, copper, and dielectric layer surfaces substantially flush. Generating such a relatively planar surface can ensure that undesirable copper "puddles" will not form in the dielectric layers that are deposited onto that polished structure. Even if such copper "puddles" occur in subsequently deposited layers, because the slurry of the present invention facilitates removal of copper at a relatively high rate, such "puddles" can be removed, when the barrier layer for the next layer of copper lines is polished off the subsequently deposited dielectric layers. In addition to preventing the development of copper "puddles" in subsequently deposited dielectric layers, a CMP process that uses the slurry of the present invention can reduce, or eliminate, relatively deep dielectric layer recesses and fang-like protrusions that may result when CMP processes, which use other slurries, are used to remove the barrier layer.

Although the foregoing description has specified certain materials that may be used in the slurry of the present invention, and relative amounts of those materials that may be included in that slurry, those skilled in the art will appreciate that many modifications and substitutions may be made. Accordingly, it is intended that all such modifications, alterations, substitutions and additions be considered to fall within the spirit and scope of the invention as defined by the appended claims.

What is claimed is:

1. A slurry for polishing a barrier layer that serves to isolate a copper layer from a dielectric layer comprising a mixture of:

about 14.7 grams per liter of a citric acid salt;

between about 4.4% and about 8.8% by volume of a silica based abrasive; and about 0.38 grams per liter of a 30% $H_2O_2$ solution.

2. The slurry of claim 1 wherein the mixture includes about 8.8% by volume of a precipitated silica abrasive, has a pH that is about 7.4, and wherein the citric acid salt is potassium citrate.

* * * * *